US012272893B2

(12) United States Patent
Kubota

(10) Patent No.: US 12,272,893 B2
(45) Date of Patent: Apr. 8, 2025

(54) ELECTRICAL CONNECTION STRUCTURE

(71) Applicant: Yazaki Corporation, Tokyo (JP)

(72) Inventor: Minoru Kubota, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 349 days.

(21) Appl. No.: 17/873,767

(22) Filed: Jul. 26, 2022

(65) Prior Publication Data

US 2023/0032114 A1 Feb. 2, 2023

(30) Foreign Application Priority Data

Jul. 28, 2021 (JP) ................................ 2021-123528

(51) Int. Cl.

| | |
|---|---|
| ***H01R 12/70*** | (2011.01) |
| ***H01R 12/71*** | (2011.01) |
| ***H01R 12/75*** | (2011.01) |
| ***H01R 13/04*** | (2006.01) |
| ***H01R 13/11*** | (2006.01) |

(52) U.S. Cl.
CPC ....... *H01R 13/113* (2013.01); *H01R 12/7076* (2013.01); *H01R 12/718* (2013.01); *H01R 12/75* (2013.01); *H01R 13/04* (2013.01)

(58) Field of Classification Search
CPC .............. H01R 13/113; H01R 12/7076; H01R 12/718; H01R 12/75; H01R 13/04; H01R 2201/26; H01R 13/187; H01R 12/58; H01R 12/7088; H01R 11/32
See application file for complete search history.

(56) References Cited

U.S. PATENT DOCUMENTS

| | | | | |
|---|---|---|---|---|
| 4,764,133 | A | 8/1988 | Kaneko | |
| 5,340,338 | A | 8/1994 | Sai et al. | |
| 6,302,709 | B1 | 10/2001 | Ross | |
| 7,581,972 | B2 | 9/2009 | Daamen | |
| 7,601,019 | B2 * | 10/2009 | Hsieh | H01R 13/426 439/345 |
| 7,963,810 | B1 * | 6/2011 | Yang | H01R 12/724 439/686 |
| 8,100,699 | B1 * | 1/2012 | Costello | H01R 12/724 439/541.5 |
| 9,431,760 | B2 * | 8/2016 | Itou | H01R 24/28 |
| 9,871,309 | B2 * | 1/2018 | Gao | H01R 4/302 |
| 10,581,196 | B2 * | 3/2020 | Liu | H01R 25/162 |

(Continued)

FOREIGN PATENT DOCUMENTS

| | | |
|---|---|---|
| JP | 62-135374 U | 8/1987 |
| JP | 2017-121178 A | 7/2017 |

*Primary Examiner* — Abdullah A Riyami
*Assistant Examiner* — Nelson R. Burgos-Guntin
(74) *Attorney, Agent, or Firm* — Sughrue Mion, PLLC

(57) ABSTRACT

An electrical connection structure includes: a first unit including a terminal; and a second unit including a connection terminal. The electrical connection structure is configured by mounting the second unit to the first unit such that the connection terminal is electrically connected to the terminal. The terminal has a plate-shaped tab. The connection terminal includes a receptacle formed with a connection groove into which the tab is inserted, and a spring contact provided on inner side surfaces of the connection groove. The spring contact comes into elastic contact with outer surfaces of the tab inserted into the connection groove.

2 Claims, 11 Drawing Sheets

(56) References Cited

U.S. PATENT DOCUMENTS

| | | | | |
|---|---|---|---|---|
| 10,651,639 | B2 * | 5/2020 | Shiraki | H01R 11/01 |
| 11,329,410 | B2 * | 5/2022 | He | H01R 12/7088 |
| 2004/0114338 | A1 * | 6/2004 | Blasko | H01R 12/721<br>361/777 |
| 2007/0015398 | A1 * | 1/2007 | Ikeda | H01R 13/5829<br>439/470 |
| 2009/0023347 | A1 * | 1/2009 | Hou | H01R 13/2421<br>439/824 |
| 2009/0047814 | A1 * | 2/2009 | Daamen | H01R 13/18<br>439/251 |
| 2011/0306243 | A1 * | 12/2011 | Shiraki | H01R 13/688<br>439/620.29 |
| 2014/0057484 | A1 * | 2/2014 | Byrne | H01R 13/46<br>439/527 |
| 2014/0065882 | A1 * | 3/2014 | Byrne | H01R 25/00<br>439/625 |
| 2015/0188242 | A1 * | 7/2015 | Koyama | H01R 9/18<br>439/171 |
| 2017/0117700 | A1 * | 4/2017 | Idota | H01R 13/10 |
| 2019/0296494 | A1 * | 9/2019 | Kitagawa | H01R 13/748 |
| 2020/0161783 | A1 * | 5/2020 | He | H01R 12/7076 |
| 2020/0274375 | A1 * | 8/2020 | Griffiths | H02J 7/24 |
| 2020/0373541 | A1 * | 11/2020 | Yasuda | H01R 4/625 |
| 2020/0388959 | A1 * | 12/2020 | Furugoori | H01R 13/7032 |
| 2020/0388960 | A1 * | 12/2020 | Yagi | B60L 50/64 |
| 2020/0411231 | A1 * | 12/2020 | Tsuchida | H01F 27/266 |

* cited by examiner

ELECTRICAL CONNECTION STRUCTURE

This application is based on and claims priority under 35 USC 119 from Japanese Patent Application No. 2021-123528 filed on Jul. 28, 2021, the contents of which are incorporated herein by reference.

TECHNICAL FIELD

The present disclosure relates to an electrical connection structure to be used, for example, in a vehicle.

BACKGROUND ART

A vehicle is equipped with a power supply such as a battery and a large number of loads. Electric power from the power supply is supplied to each load via, for example, a power supply unit or a wire harness.

JP2017-121178A discloses an electrical connection structure including a charging device with which a battery is charged with electric power from an external power supply, an inverter that converts a current of the battery from a direct current to an alternating current and supplies the alternating current to a motor, and a junction box that relays electrical connections thereof. In this electrical connection structure, the inverter and the junction box are connected to each other via a bus bar penetrating through an opening provided in a partition member.

In the electrical connection structure described above, the bus bar connecting the inverter and the junction box is fastened and connected to a terminal portion of the inverter and a terminal portion of the junction box by bolts, respectively. For this reason, it takes time and effort to perform a connection operation, and it is necessary to perform complicated torque management in fastening the bolts.

SUMMARY OF INVENTION

The present disclosure provides an electrical connection structure capable of easily electrically connecting units to each other.

According to an illustrative aspect of the present disclosure, an electrical connection structure includes: a first unit including a terminal; and a second unit including a connection terminal. The electrical connection structure is configured by mounting the second unit to the first unit such that the connection terminal is electrically connected to the terminal. The terminal has a plate-shaped tab. The connection terminal includes a receptacle formed with a connection groove into which the tab is inserted, and a spring contact provided on inner side surfaces of the connection groove. The spring contact comes into elastic contact with outer surfaces of the tab inserted into the connection groove.

The present disclosure has been briefly described as above. Details of the present disclosure will be further clarified by reading through an embodiment for implementing the invention described below (hereinafter, referred to as an "embodiment") with reference to accompanying drawings.

DESCRIPTION OF EMBODIMENTS

An example of an embodiment related to the present disclosure will be described below with reference to the drawings.

Figure 1:
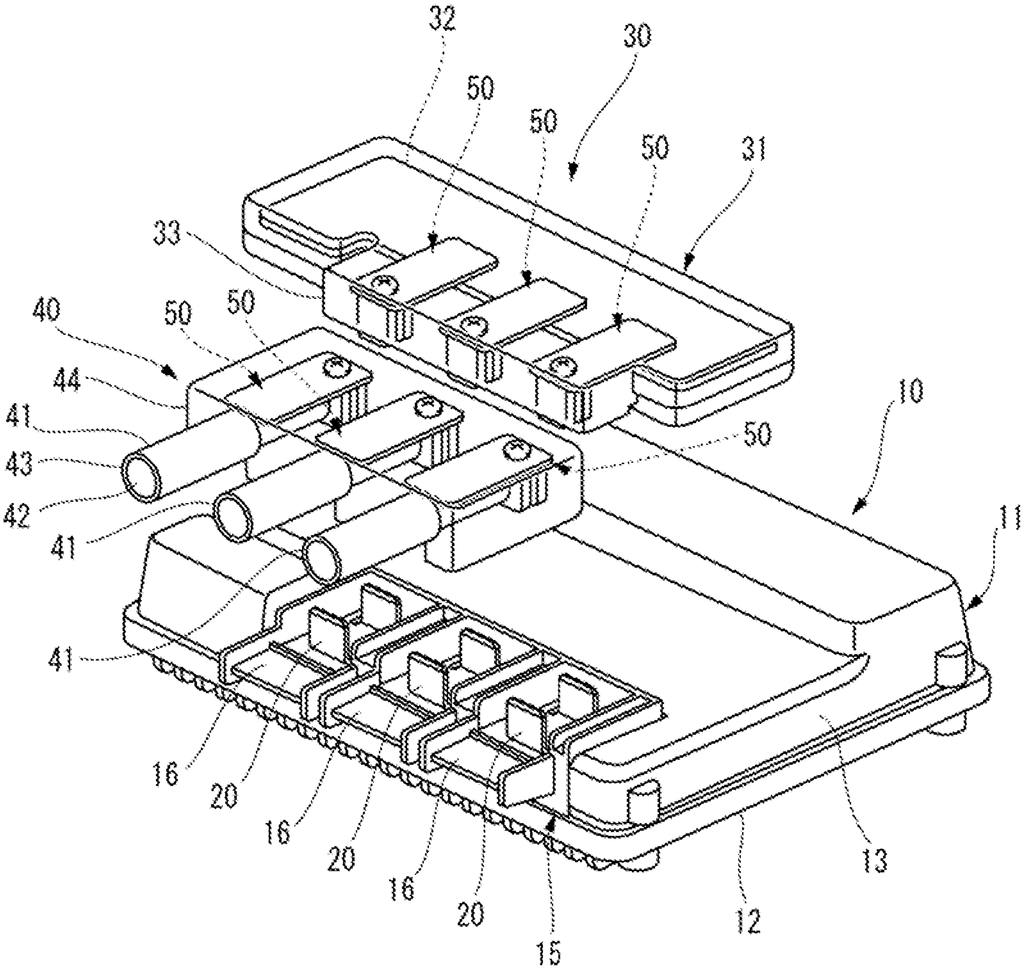
FIG. 1 is a perspective view of a power supply unit, a junction box, and a wire harness including an electrical connection structure according to an embodiment.
Figure 2:
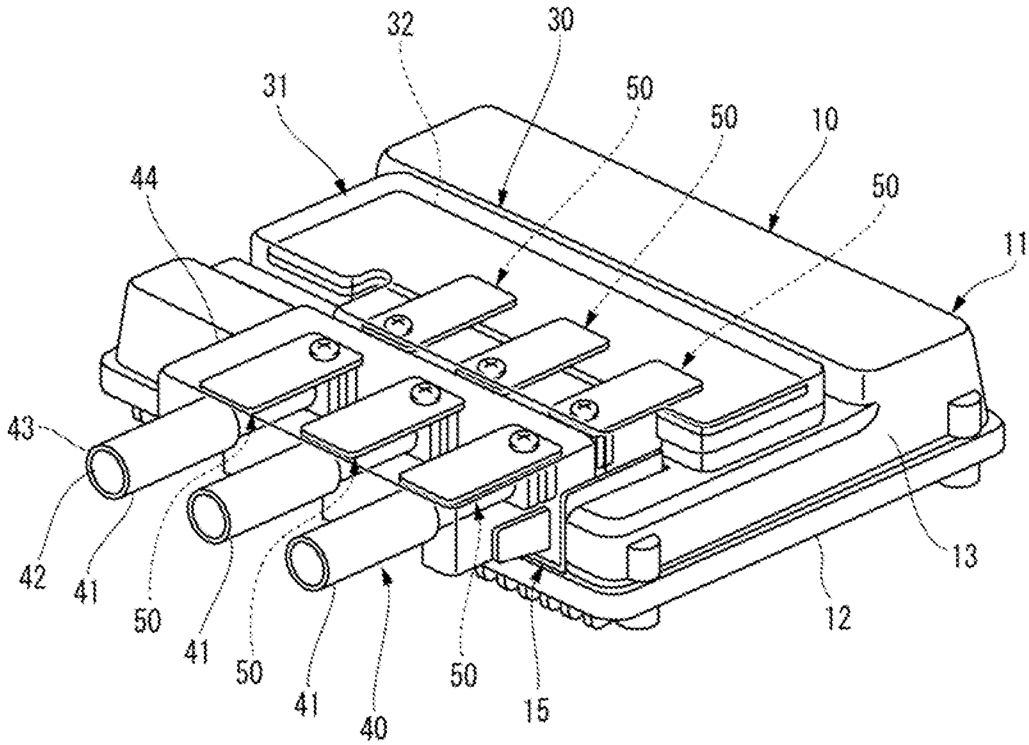
FIG. 2 is a perspective view of the power supply unit to which the junction box and the wire harness are assembled.

FIG. 1 is a perspective view of a power supply unit, a junction box, and a wire harness including an electrical connection structure according to the present embodiment. FIG. 2 is a perspective view of the power supply unit to which the junction box and the wire harness are assembled.

As illustrated in FIGS. 1 and 2, the electrical connection structure according to the present embodiment is a connection structure that electrically connects a connection partner to a power supply unit (first unit) 10. In the present embodiment, the power supply unit 10 is, for example, a DC/DC converter to be mounted on a vehicle such as an automobile. A junction box (second unit) 30 and a wire harness (third unit) 40 are connected to the power supply unit 10 as connection partners.

The power supply unit 10 has a housing 11. In the housing 11, a power supply circuit is built. The housing 11 includes a case 12 and a cover 13, and is mounted such that the cover 13 covers an upper portion of the case 12.

The power supply unit 10 includes a terminal block 15. The terminal block 15 is assembled to the case 12 of the housing 11. The terminal block 15 has a plurality of (three in this embodiment) connecting portions 16, and terminals 20 are provided in the connecting portions 16 respectively. These terminals 20 are connected to a circuit board (not shown) provided in the housing 11.

The junction box 30 includes a housing 31. In the housing 31, a circuit board 32 is accommodated. The junction box 30 includes a connection terminal portion 33. In the connection terminal portion 33, a plurality of (three in this embodiment) connection terminals 50 are accommodated. These connection terminals 50 are electrically connected to the circuit board 32 accommodated in the housing 31.

The junction box 30 is mounted to the power supply unit 10 from above (see FIG. 2). When the junction box 30 is mounted to the power supply unit 10, the connection terminal portion 33 is assembled to the terminal block 15 of the power supply unit 10. Accordingly, the connection terminals 50 of the junction box 30 are electrically connected to the terminals 20 provided on the terminal block 15 of the power supply unit 10.

A locking structure (not shown) such as a snap fit structure is provided between the housing 11 of the power supply unit

10 and the housing 31 of the junction box 30. Accordingly, when the junction box 30 is mounted to the power supply unit 10, the housing 31 of the junction box 30 is locked to the housing 11 of the power supply unit 10, and an electrically connected state between the connection terminals 50 in the housing 31 and the terminals 20 of the terminal block 15 of the power supply unit 10 is maintained. The housing 31 of the junction box 30 may be fixed to the housing 11 of the power supply unit 10 by screwing in a state where the junction box 30 is mounted to the power supply unit 10.

The wire harness 40 includes electric wires 41 formed of a plurality of (three in this embodiment) power lines. Each of the electric wires 41 is an insulated electric wire in which a periphery of a conductor 42 is covered with a sheath 43 made of an insulating resin. A housing 44 is assembled to end portions of the electric wires 41. A plurality of (three in this embodiment) connection terminals 50 are accommodated in the housing 44. The conductors 42 of the electric wires 41 exposed at the end portions are connected to these connection terminals 50 by, for example, soldering or ultrasonic bonding.

As illustrated in FIG. 2, the housing 44 of the wire harness 40 is mounted to the power supply unit 10 from above. When the housing 44 of the wire harness 40 is mounted to the power supply unit 10, the connection terminals 50 in the housing 44 are electrically connected to the terminals 20 provided on the terminal block 15 of the power supply unit 10.

A locking structure (not shown) such as a snap fit structure is also provided between the housing 11 of the power supply unit 10 and the housing 44 of the wire harness 40. Accordingly, when the housing 44 of the wire harness 40 is mounted to the power supply unit 10, the housing 44 of the wire harness 40 is locked to the housing 11 of the power supply unit 10, and an electrically connected state between the connection terminals 50 in the housing 44 and the terminals 20 of the terminal block 15 of the power supply unit 10 is maintained. The housing 44 of the wire harness 40 may be fixed to the housing 11 of the power supply unit 10 by screwing in a state where the housing 44 of the wire harness 40 is mounted to the power supply unit 10.

Figure 3:
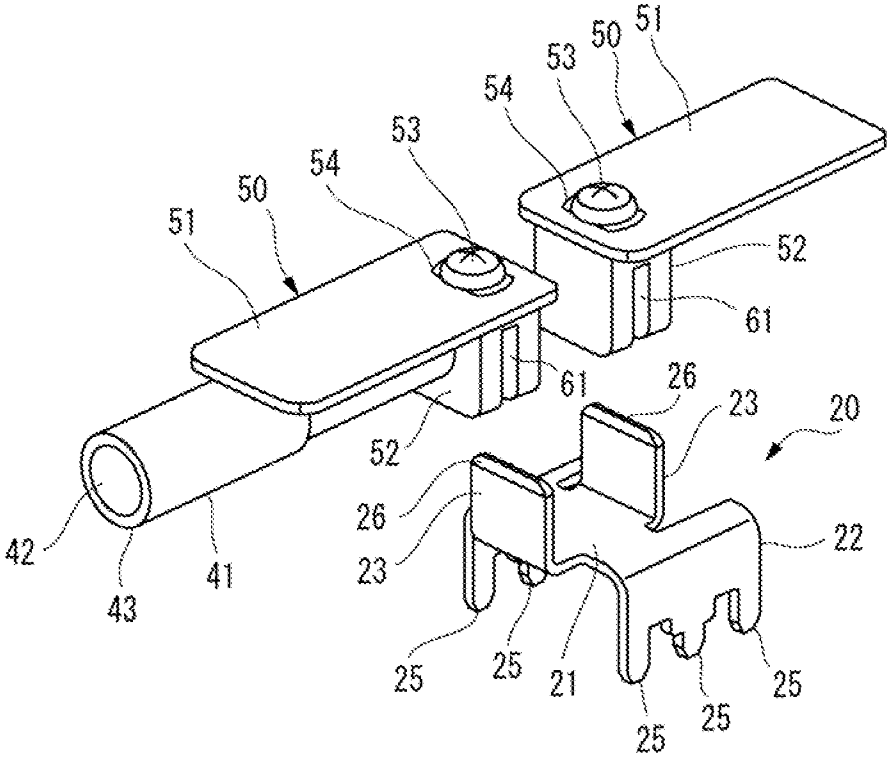
FIG. 3 is a perspective view of a terminal and a connection terminal in a non-connected state.
Figure 4:
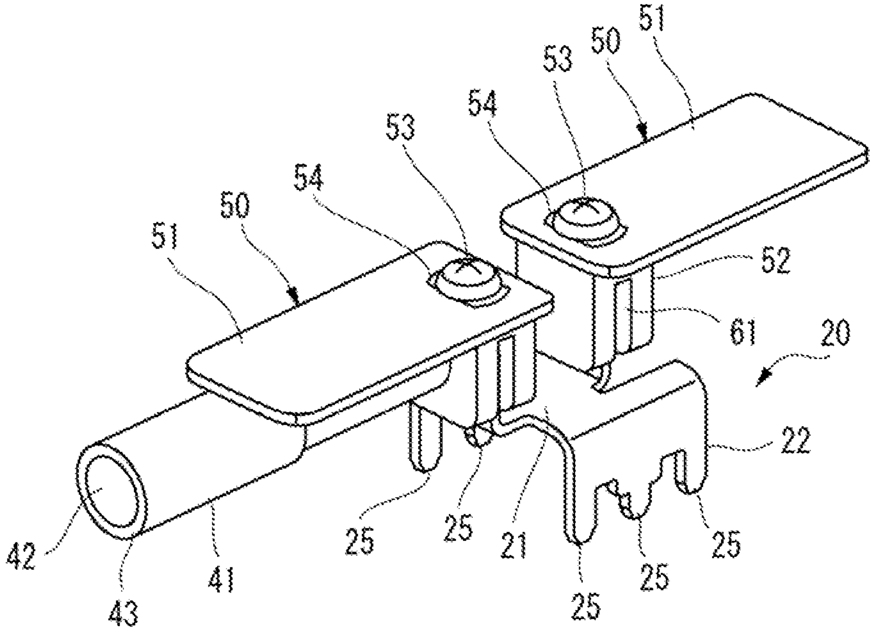
FIG. 4 is a perspective view of the terminal and the connection terminal in a connected state.

FIGS. 3 and 4 are views illustrating a structure of the terminal and the connection terminal. Specifically, FIG. 3 is a perspective view thereof in a non-connected state, and FIG. 4 is a perspective view thereof in a connected state. The terminal 20 and the connection terminal 50 will be described with reference to FIGS. 3 and 4.

As illustrated in FIGS. 3 and 4, the terminal 20 is made of, for example, a conductive metal plate such as copper or a copper alloy, and is formed by press working. The terminal 20 includes a main body portion 21, a pair of leg portions 22, and a pair of tabs 23.

The main body portion 21 is formed in a plate shape. The leg portions 22 are formed on the left and right side edges of the main body portion 21, and the tabs 23 are formed on the front and rear side edges of the main body portion 21.

The leg portions 22 are bent downward at the left and right side edges of the main body portion 21, and a plurality of pins 25 protruding downward are formed at end portions of the leg portions 22. The pins 25 formed in each leg portion 22 are inserted into and fixed to a through hole (not shown) formed in a circuit board accommodated in the housing 11 of the power supply unit 10. The pins 25 of each leg portion 22 are soldered and electrically connected to a conductor pattern of the circuit board.

The tabs 23 are bent and extend upward in a direction opposite to the leg portions 22 at the front and rear side edges of the main body portion 21. Both side surfaces of an end portion of each tab 23 have tapered surfaces 26 that are gradually inclined toward a center in a thickness direction while extending toward a tip end.

Each connection terminal 50 includes a coupling plate 51 and a receptacle 52. The coupling plate 51 is made of, for example, a conductive metal plate such as copper or a copper alloy, and an insertion hole 54 into which a screw 53 can be inserted is formed in an end portion of the coupling plate 51. The receptacle 52 is made of, for example, a conductive metal material such as copper or a copper alloy, and is formed in a block shape. A screw hole (not shown) is formed in an upper portion of the receptacle 52, and the screw 53 inserted into the insertion hole 54 of the coupling plate 51 is screwed into the screw hole. Accordingly, the receptacle 52 is fastened and fixed to the end portion of the coupling plate 51 by the screw 53 and is electrically connected to the end portion of the coupling plate 51.

In the junction box 30, the coupling plate 51 is fixed to the circuit board 32 accommodated in the housing 31 so that the connection terminal 50 is electrically connected to a conductor pattern of the circuit board 32. In the wire harness 40, the coupling plate 51 is bonded to the conductor 42 of the electric wire 41 so that the connection terminal 50 is electrically connected to the conductor 42 of the electric wire 41.

Figure 5:
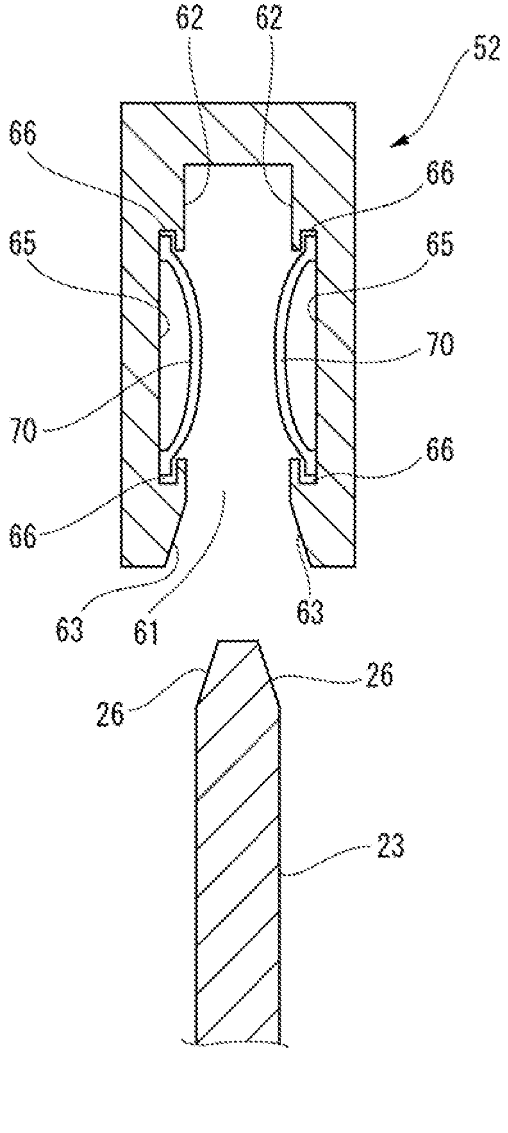
FIG. 5 is a side cross-sectional view of a tab and a receptacle for illustrating a structure of the tab and the receptacle.
Figure 6:
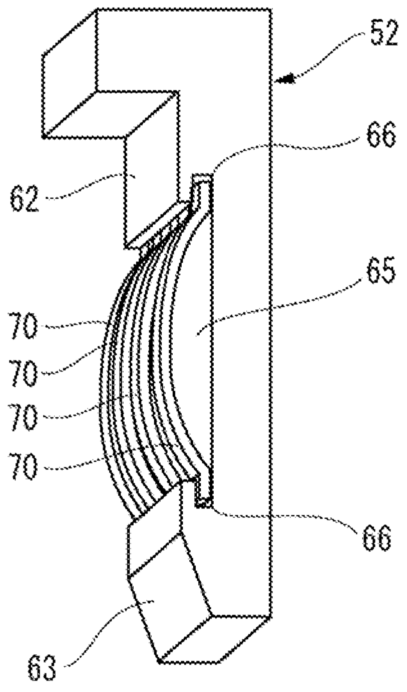
FIG. 6 is a perspective view of the receptacle cut at a center.

FIG. 5 is a side cross-sectional view of the tab and the receptacle for illustrating a structure of the tab and the receptacle. FIG. 6 is a perspective view of the receptacle cut at a center.

As illustrated in FIG. 5, the receptacle 52 has a connection groove 61. The connection groove 61 is open on a side of the receptacle 52 opposite to a side fixed to the coupling plate 51, and has a groove width slightly larger than a thickness of the tab 23 of the terminal 20. The tab 23 of the terminal 20 is inserted between facing inner side surfaces 62 of the connection groove 61 of the receptacle 52. Guide surfaces 63, which are gradually inclined outward while extending toward tip ends, are formed at an open end of the connection groove 61 on the facing inner side surfaces 62 of the connection groove 61.

As illustrated in FIG. 6, the receptacle 52 has a plurality of spring contacts 70. These spring contacts 70 are formed by forming spring steel in a rod shape, and a plurality of (four in this embodiment) spring contacts 70 are attached to each of the inner side surfaces 62 of the connection groove 61.

A mounting recess 65 is formed in each inner side surface 62 of the connection groove 61, and the spring contacts 70 are disposed along an insertion and removal direction of the tab 23 with respect to the connection groove 61 and are mounted in the mounting recess 65. Locking grooves 66 are formed in corner portions between a bottom surface and side surfaces of each mounting recess 65, and the spring contacts 70 are arranged in parallel in the mounting recess 65 in a state where both ends of each spring contact 70 are locked to the locking grooves 66. The spring contacts 70 mounted to the mounting recesses 65 bulge toward a center of the connection groove 61.

Next, the connection between the terminal 20 and the connection terminal 50 will be described by taking a case of connecting the junction box 30 to the terminal block 15 of the power supply unit 10 as an example.

Figure 7:
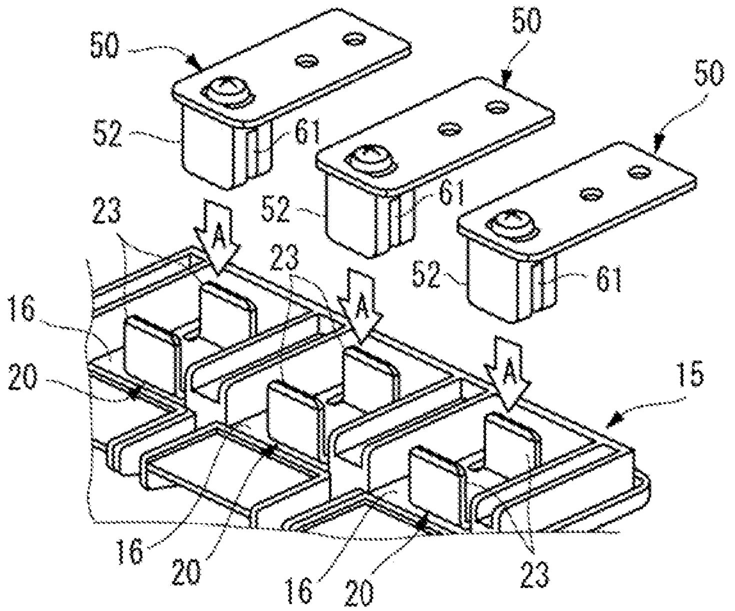
FIG. 7 is a perspective view of the connection terminal and the terminal before connection.
Figure 8:
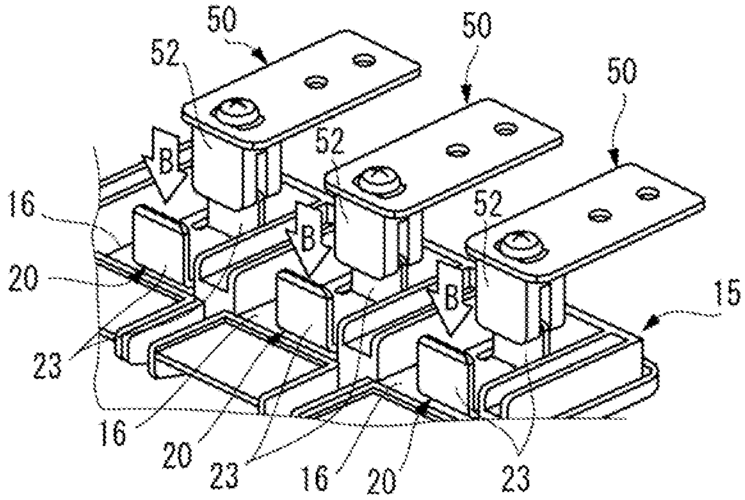
FIG. 8 is a perspective view of the connection terminal and the terminal in the middle of the connection.
Figure 9:
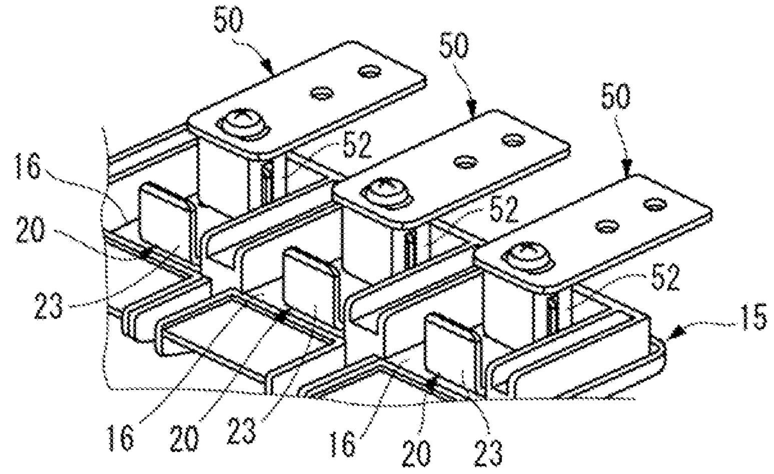
FIG. 9 is a perspective view of the connection terminal and the terminal in a connected state.
Figure 10:
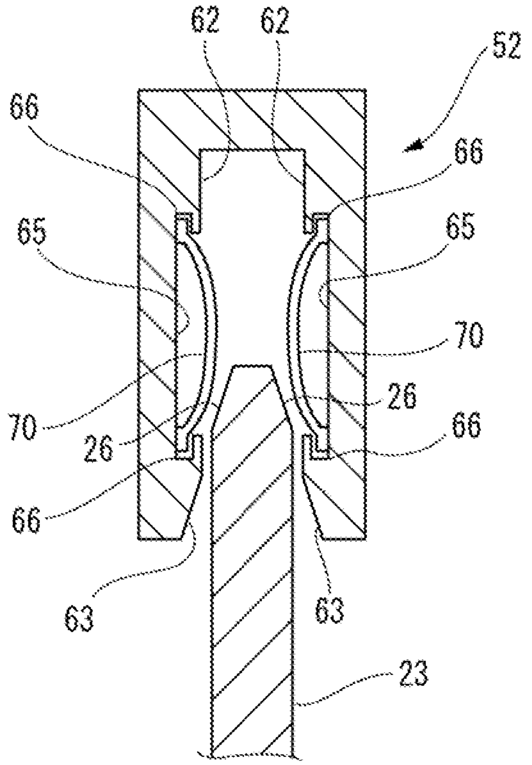
FIG. 10 is a side cross-sectional view of the tab and the receptacle in the middle of connection.
Figure 11:
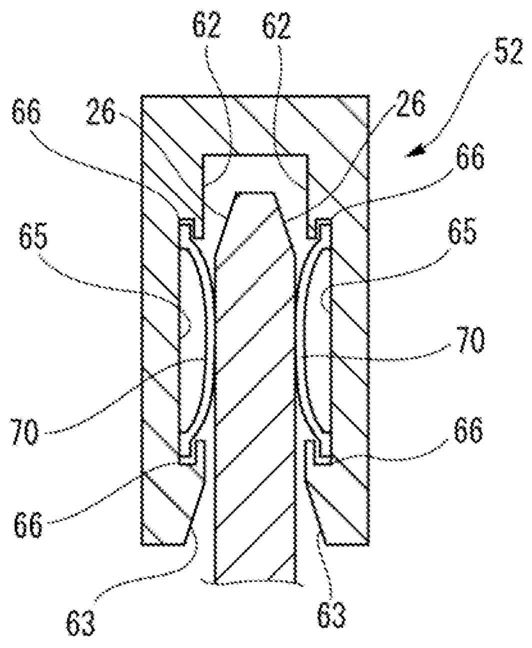
FIG. 11 is a side cross-sectional view of the tab and the receptacle in a connected state.

FIGS. 7 to 9 are views illustrating a method of connecting the connection terminal to the terminal. Specifically, FIG. 7 is a perspective view of the connection terminal and the terminal before the connection, FIG. 8 is a perspective view thereof in the middle of the connection, and FIG. 9 is a perspective view thereof in a connected state. FIGS. 10 and 11 are views illustrating a process of the connection between the tab and the receptacle. Specifically, FIG. 10 is a side cross-sectional view of the tab and the receptacle in the middle of the connection, and FIG. 11 is a side cross-sectional view thereof in a connected state. FIG. 5 illustrated above corresponds to a side cross-sectional view before the connection between the tab and the receptacle.

As illustrated in FIG. 7, the connection terminal portion 33 of the junction box 30 is disposed above the terminal block 15 of the power supply unit 10. Accordingly, as illustrated in FIG. 5, the receptacle 52 of the connection terminal 50 of the connection terminal portion 33 is disposed at a position above a corresponding tab 23 of the terminal 20 of the terminal block 15.

As illustrated in FIG. 8, the junction box 30 is moved downward (in a direction of an arrow A in FIG. 7) with respect to the power supply unit 10. Then, as illustrated in FIG. 10, a tip end portion of the tab 23 of the terminal 20 enters the connection groove 61 of the receptacle 52 of the connection terminal 50. Here, the tip end of the tab 23 has the tapered surfaces 26 that are gradually inclined toward the center in the thickness direction while extending toward the tip end, and the receptacle 52 has the guide surfaces 63, which are gradually inclined outward while extending toward the tip ends, at the open end of the connection groove 61. Accordingly, the tapered surfaces 26 are guided by the guide surfaces 63, so that the tab 23 is smoothly guided to the connection groove 61 of the receptacle 52.

As illustrated in FIG. 9, the junction box 30 is pushed downward (in a direction of an arrow B in FIG. 8) with respect to the power supply unit 10 to be completely fitted. Then, as illustrated in FIG. 11, the tab 23 of the terminal 20 is inserted into the connection groove 61 of the receptacle 52 of the connection terminal 50. Accordingly, the plurality of spring contacts 70, which are provided on the inner side surfaces 62 of the connection groove 61 and bulge toward the center of the connection groove 61, are pressed outward and elastically deformed, so that these spring contacts 70 are brought into elastic contact with both surfaces of the tab 23. Accordingly, the tab 23 and the receptacle 52 are conductively connected to each other via the plurality of spring contacts 70, and the terminal 20 and the connection terminal 50 are electrically connected to each other.

As described above, according to the electrical connection structure of the present embodiment, when the junction box 30 is mounted to the power supply unit 10, the tab 23 of the terminal 20 of the power supply unit 10 is inserted into the connection groove 61 of the receptacle 52 provided in the connection terminal 50 of the junction box 30. Then, the plurality of spring contacts 70 of the receptacle 52 are brought into elastic contact with both surfaces of the tab 23. Accordingly, the terminal 20 of the power supply unit 10 and the connection terminal 50 of the junction box 30 can be easily brought into electrical connection with each other with a small insertion force without performing a fastening operation or torque management that takes time and effort. In addition, since the plurality of spring contacts 70 are in contact with both surfaces of the tab 23, it is possible to flow a large current in a connection portion while reducing contact resistance.

The connection terminal 50 provided on the electric wire 41 of the wire harness 40 can also be connected to the terminal 20 of the power supply unit 10. Then, by connecting the connection terminal 50 of the electric wire 41 of the wire harness 40 to the terminal 20 of the power supply unit 10, the tab 23 of the terminal 20 of the power supply unit 10 is inserted into the connection groove 61 of the receptacle 52 provided in the connection terminal 50 of the electric wire 41. Then, the plurality of spring contacts 70 of the receptacle 52 are brought into elastic contact with both surfaces of the tab 23. Accordingly, the terminal 20 of the power supply unit 10 and the connection terminal 50 of the electric wire 41 of the wire harness 40 can be easily brought into electrical connection with each other with a small insertion force without performing a fastening operation or torque management that takes time and effort.

As described above, since the terminal 20 of the power supply unit 10 includes the pair of tabs 23, the connection terminals 50 of both the junction box 30 and the electric wire 41 can be connected to the pair of tabs 23 of the terminal 20 of the power supply unit 10.

The spring contacts 70 provided in the receptacle 52 may be a leaf type formed in a wide curved plate shape, a comb tooth type in which a plurality of slits are formed in a wide curved plate-shaped portion, or the like.

The present disclosure is not limited to the embodiment described above, and modifications, improvements, and the like can be made as appropriate. In addition, materials, shapes, dimensions, numbers, arrangement locations, and the like of components in the above-described embodiment are optional and not limited as long as the present disclosure can be achieved.

According to a first aspect of the present disclosure, an electrical connection structure includes: a first unit (power supply unit 10) including a terminal (20); and a second unit (junction box 30) including a connection terminal (50). The electrical connection structure is configured by mounting the second unit (30) to the first unit (10) such that the connection terminal (50) is electrically connected to the terminal (20). The terminal (20) has a plate-shaped tab (23). The connection terminal (50) includes a receptacle (52) formed with a connection groove (61) into which the tab (23) is inserted, and a spring contact (70) provided on inner side surfaces (62) of the connection groove (61). The spring contact (70) comes into elastic contact with outer surfaces of the tab (23) inserted into the connection groove (61).

According to the electrical connection structure having the configuration of the first aspect, when the second unit is mounted to the first unit, the tab of the terminal of the first unit is inserted into the connection groove of the receptacle provided in the connection terminal of the second unit. Then, the plurality of spring contacts of the receptacle are brought into elastic contact with both surfaces of the tab. Accordingly, the terminal of the first unit and the connection terminal of the second unit can be easily brought into electrical connection with each other with a small insertion force without performing a fastening operation or torque management that takes time and effort. In addition, since the plurality of spring contacts are in contact with both surfaces of the tab, it is possible to flow a large current in a connection portion while reducing contact resistance.

According to a second aspect of the present disclosure, a third unit (wire harness 40) including an electric wire (41) and the connection terminal (50) provided at an end portion of the electric wire (41). The connection terminal (50) of the third unit (40) is connected to the terminal (20) of the first unit (power supply unit 10) such that the spring contact (70) of the receptacle (52) comes into elastic contact with the outer surfaces of the tab (23).

According to the electrical connection structure having the configuration of the second aspect, when the connection terminal provided on the electric wire of the wire harness is connected to the terminal of the first unit, the tab of the terminal of the first unit is inserted into the connection groove of the receptacle provided on the connection terminal of the electric wire. Then, the plurality of spring contacts of the receptacle are brought into elastic contact with both surfaces of the tab. Accordingly, the connection terminal of the electric wire of the wire harness can be easily brought into electrical connection to the terminal of the first unit with a small insertion force without performing a fastening operation or torque management that takes time and effort.

According to a third aspect of the present disclosure, the tab (23) of the terminal (20) includes a pair of tabs (23). The connection terminal (50) of the second unit (junction box 30) is connected to one of the pair of tabs (23), and the connection terminal (50) of the third unit (wire harness 40) is connected to the other of the pair of tabs (23).

According to the electrical connection structure having the configuration of the third aspect, the connection terminals of both the second unit and the electric wire can be connected to the pair of tabs of the terminal of the first unit.

According to the present disclosure, it is possible to provide an electrical connection structure capable of easily electrically connecting units to each other.

What is claimed is:

1. An electrical connection structure comprising:

a first unit including a terminal;

a second unit including a connection terminal; and a third unit including an electric wire and a second connection terminal provided at an end portion of the electric wire, wherein the electrical connection structure is configured by mounting the second unit to the first unit such that the connection terminal is electrically connected to the terminal, wherein the terminal comprises a main body portion, a pair of leg portions and a pair of tabs, the pair of tabs are bent and extend upward in a direction opposite to the leg portions at front and rear side edges of the main body portion, wherein the connection terminal and the second connection terminal respectively include a receptacle formed with a connection groove into which one of the pair of tabs is inserted, and a spring contact provided on inner side surfaces of the connection groove, wherein the spring contact comes into elastic contact with outer surfaces of the tab inserted into the connection groove, and wherein the second connection terminal of the third unit is connected to the terminal of the first unit such that the spring contact of the receptacle comes into elastic contact with the outer surfaces of the tab.

2. The electrical connection structure according to claim 1, wherein the connection terminal of the second unit is connected to one of the pair of tabs, and the second connection terminal of the third unit is connected to the other of the pair of tabs.

* * * * *